(12) United States Patent
Kuno

(10) Patent No.: US 6,331,900 B1
(45) Date of Patent: Dec. 18, 2001

(54) CONTROLLER FOR IMAGE FORMING APPARATUS

(75) Inventor: Takatsugu Kuno, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/186,894

(22) Filed: Nov. 6, 1998

(30) Foreign Application Priority Data

Nov. 13, 1997 (JP) .................................................... 9-312138

(51) Int. Cl.⁷ ............................................................ G06K 15/00
(52) U.S. Cl. ........................................... 358/1.9; 358/1.12
(58) Field of Search ................................ 358/401, 404, 358/444, 443, 1.15, 1.9, 1.12; 395/109, 115, 116, 114

(56) References Cited

U.S. PATENT DOCUMENTS

| | | | |
|---|---|---|---|
| 3,822,876 | * 7/1974 | Frain | 270/1 |
| 5,699,494 | * 12/1997 | Colbert et al. | 395/114 |
| 5,704,722 | * 1/1998 | Kanou | 400/61 |
| 5,727,135 | * 3/1998 | Webb | 395/113 |
| 5,812,536 | * 9/1998 | Manduely | 370/282 |
| 5,970,228 | * 10/1999 | Nezu | 395/186 |

FOREIGN PATENT DOCUMENTS 5-122477   5/1993   (JP) ................................. H04N/1/21

* cited by examiner

Primary Examiner—Jerome Grant, II
(74) Attorney, Agent, or Firm—Burns, Doane, Swecker & Mathis, LLP

(57) ABSTRACT

Disclosed is an image forming apparatus having a memory recall function and a serial number printing function. In a case where a user selects the both function after printing of a specific print job, a controller of the image forming apparatus automatically calculates a starting serial number which is to be added to a first sets of prints of the next job.

27 Claims, 18 Drawing Sheets

CONTROLLER FOR IMAGE FORMING APPARATUS

This application is based on application No. HEI 09-312138 filed in Japan, the contents of which are hereby incorporated by reference.

BACKGROUND OF THE INVENTION

1. Field of the Invention

The present invention pertains to an image forming apparatus and its controller, and more particularly, to (i) an image forming apparatus that forms one or more sets of images while saving data for one set of images in memory and that forms one or more sets of images using the stored image data, and (ii) a controller that is used in said image forming apparatus.

2. Description of the Related Art

Various technologies have conventionally been added to image forming apparatuses to enable the user to efficiently print or make copies of images and make it easy for the user to manage the printed images.

Using the technology disclosed in Japanese Laid-Open Patent Application HEI 5-122477, the image data for which printing has been completed is saved in an image memory, and this image data is read and printing is performed once again through a prescribed operation. This technology pertains to a function to (i) record and save image data for an image for which printing has been completed and (ii) perform printing once again by reading this image data. (In the present specification, this function and a mode using this function are hereinafter termed the memory recall function and the memory recall mode, respectively).

Separate from the technology introduced above, an image forming apparatus having a function to allocate a management number to each set of copies when a set of images is printed in one print job is also known. (In the present specification, this function and a mode using this function are hereinafter termed the serial number printing function and the serial number printing mode, respectively.) Using this serial number printing function, the user can easily determine the number of sets of images printed.

However, there are situations in which the user wishes to allocate, while using the memory recall function, a number to a set of copies that is sequential to the last number that was allocated to the prior set of printed images previously printed. An image forming apparatus having the memory recall function and the serial number printing function is already known. However, in the conventional image forming apparatus having these functions, the user must manually input a management number that is sequential to the last management number of the previous job so that the input management number will be the starting control number for the current job, after confirming the number of sets of images that were previously printed with control numbers.

This type of manual operation is inconvenient for the user, and moreover, when manual inputting is performed, there is a possibility that an image having the same management number may be printed due to mistaken operation by the user, and accurate management may not be achieved.

SUMMARY OF THE INVENTION

The present invention has been made to resolve these problems. Its object is to provide an image forming apparatus and a controller for an image forming apparatus that (i) eliminate the need for an operation that is inconvenient for the user and (ii) can accurately manage the number of images formed.

For example, the present invention pertains to a controller for an image forming apparatus, which comprises a processor which automatically determines a starting serial number which is to be given to the first set of prints of a first print job in a case where a memory recall function and a serial number printing function are set, the starting serial number being sequential to the last serial number given to a second print job previously executed.

Image forming apparatus to which the controller having the above mentioned construction is applied may be a printer which makes printed materials based on image data inputted from external host computer, or may be a copier which reads document images, generates image data of the document images, and makes printed materials based on image data of documents.

In the image forming apparatus in which the controller having the above mentioned construction is applied, the user need not manually input the starting serial number when performing serial number printing for a job using the memory recall function. In addition, since the starting serial number is automatically determined, the number of sets of printed images can be accurately managed.

In the image forming apparatus in which the controller having this construction is applied, the serial numbers used in the serial number printing mode may be printed on the first page only of each set of printed images.

These and other objects, advantages and features of the invention will become apparent from the following description thereof taken in conjunction with the accompanying drawings which illustrate a specific embodiment of the invention.

DETAILED DESCRIPTION OF THE PREFERRED EMBODIMENT

A digital copying machine, employing one embodiment of the present invention, is explained below with reference to the drawings.

Figure 1:
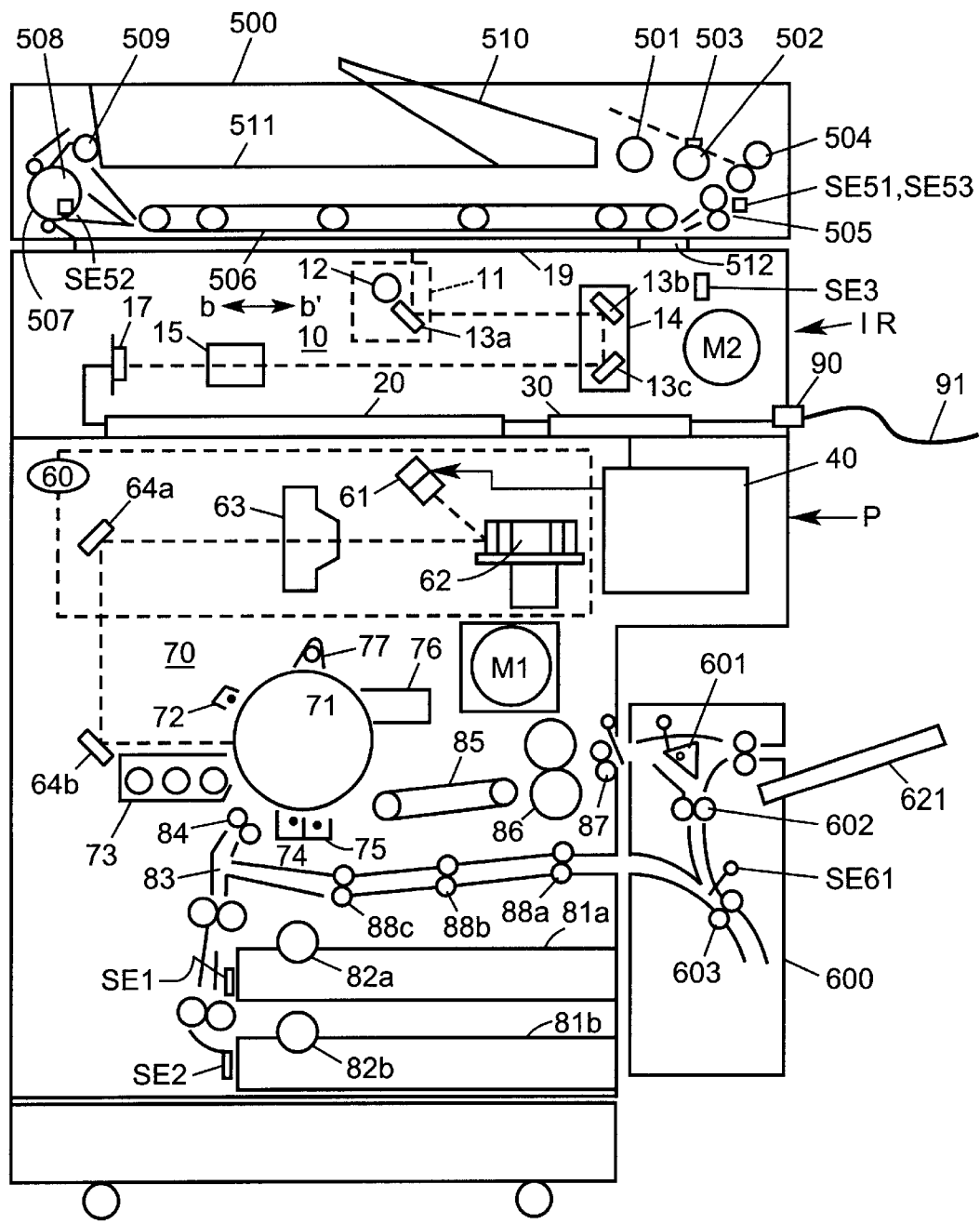
FIG. 1 is a cross-sectional view showing the construction of the digital copying machine of a first embodiment of the present invention.

FIG. 1 is a cross-sectional view showing the construction of the digital copying machine in which a first embodiment of the present invention is applied. With reference to FIG. 1, the digital copying machine comprises a scanning system 10 that reads the original document and converts it into image signals, an image signal processing unit 20 that processes the image signals sent from the scanning system 10, a memory unit 30 that stores the image data input from the image signal processor 20 and outputs it to the printing processor, a printing processing unit 40 that drives the semiconductor laser 61 based on the image data output from the memory unit 30, a laser optical system 60 that leads the laser beam from the semiconductor laser 61 to the exposure position on the photoreceptor drum 71, an image forming system 70 that develops the latent image formed by the exposure, transfers it onto a sheet of recording paper and fuses it to the paper to form an image, an operation panel (not shown in FIG. 1) located on the top surface of the digital copying machine, and an original document feeding unit 500 that feeds the original document and flips it over where necessary.

The scanning system 10 and the image signal processing unit 20 comprise the image reading unit IR, and the print processing unit 40, the laser optical system 60 and the image forming system 70 comprise the printing unit P.

The image reading unit IR reads the image of the original document placed on the platen glass 19 and generates image data that correspond to each pixel of the image of the original document. The first scanner 11 having an exposure lamp 12 and a first mirror 13a and the second scanner 14 having a second mirror 13b and a third mirror 13c move in the directions of the arrows b and b' (the second scanning directions) by means of the driving by the scan motor M2.

The light from the exposure lamp 12 is reflected by the original document on the platen glass 19 and irradiates the line sensor (CCD) 17 via the mirrors 13a, 13b and 13c and the lens 15. The line sensor 17 comprises a large number of photoelectric conversion elements aligned such that they are perpendicular to the sheet of paper on which FIG. 1 is printed (the main scanning directions). It reads the image at 400 dpi, for example, and outputs image data for each pixel.

When the first scanner 11 moves in the directions of the arrows b and b', as described above, the line sensor 17 can perform secondary scanning of the original document image. The sensor SE3 is a sensor to detect that the first scanner 11 is at the home position.

The image data output from the line sensor 17 is processed by the image signal processing unit 20 and is then sent to the memory unit 30. The memory unit 30 compresses the image data received from the image signal processing unit 20 and saves it. It then expands the data and sends it to the printing unit P. When this is done, rotation editing, etc., are performed where necessary.

The memory unit 30 has an external device interface explained below, and is connected to an external device via an external device connector 90 and an external cable 91. The image signal processing unit 20 and the memory unit 30 are explained in more detail below.

The printing unit P will now be explained. The print processing unit 40 controls the laser optical system 60 based on the image data received from the memory unit 30. The laser optical system 60 has a semiconductor laser 61 that emits a laser beam that is modulated (ON/OFF control) by the print processing unit 40, a polygon mirror 62 to cause the laser beam emitted from the semiconductor laser 61 to scan the photoreceptor drum 71, an fθ lens 63, and mirrors 64a and 64b.

Around the photoreceptor drum 71 that is rotated are located, in the direction of the path of rotation, a charger 72, a developing device 73, a transfer charger 74, a separation charger 75, a cleaner 76 and an eraser lamp 77. The photoreceptor drum 71 forms a toner image using the well-known electrophotographic process, and transfers it onto a sheet of paper. The paper is supplied from the paper supply cassette 81a or the paper supply cassette 81b by means of the paper supply rollers 82a or 82b, and is sent to the position of the transfer charger 74 through the paper conveyance path 83 by means of the timing rollers 84. The paper onto which the toner image has been transferred at the position of the transfer charger 74 is ejected toward the paper resupply unit 600 via the conveyance belt 85, the fuser 86 and the paper eject rollers 87.

The various rollers of the image forming system 70 and the photoreceptor drum 71 are driven by the main motor M1. Paper size detection sensors SE1 and SE2 are located in the vicinity of the paper supply cassettes 81a and 81b, respectively, to detect the size of the paper housed in each cassette.

The original document feeding unit 500 automatically feeds the original document set on the original document feeding tray 510 and ejects the original document that was read by the scanning system 10 onto the original document ejection tray 511.

In the normal mode, the user sets the original document, which comprises one or more sheets, on the original document feeding tray 510 such that the side to be read faces up, and adjusts the side regulator plate to the width of the original document. When the operation starts, the original document thus set is fed and conveyed sheet by sheet by means of the paper supply roller 501, starting with the bottom sheet, after being flattened by the flattening roller 502 and the flattening pad 503. The original document sheet being conveyed passes the intermediate rollers 504, and its size is detected by the resist sensor SE51 and the width sensor SE53. Any misalignment of the sheet is subsequently corrected by a resist roller 505. Immediately after the trailing edge of the original document sheet has passed the left end of the original document scale 512, the original document conveyance belt 506 travels backward slightly and then stops. As a result, the right end of the original document comes to contact with the edge of the original document scale 512, such that the original document is set at the proper position on the platen glass 19. When this is achieved, the leading edge of the next original document sheet is already located at the resist roller 505 so that the conveyance time for the next original document sheet may be reduced.

When the original document is set at the proper reading position on the platen glass 19, reading of the original document by the scanning system 10 is performed. When the reading of the original document is completed, the original document sheet is conveyed to the left by means of the original document conveyance belt 506, the direction of conveyance of the original document sheet is changed by the flipping roller 507, and the original document sheet is ejected onto the original document ejection tray 511 after passing over the switching claw 508.

Where the original document is two-sided, when the reading of the first side is completed, the original document is conveyed to the left by the original document conveyance belt 506, and after the direction of conveyance is changed by means of the flipping roller 507, it is sent onto the platen glass 19 again by means of the switching claw 508, so that the second side of the original document is set at the reading position.

When the reading of the second side is completed, the original document sheet is conveyed to the left by the original document conveyance belt 506, and ejected onto the original document ejection tray 511 via the flipping roller 507, the switching claw 508 and the eject roller 509.

The paper resupply unit 600 is mounted to one side of the printer as an additional device to automate two-sided copying. It has the function of housing the sheet of paper ejected from the main unit by means of the paper ejection rollers 87 and returning it to the printer main unit via switch-back conveyance.

In the single-sided copying mode, the sheet of paper passes through the paper resupply unit 600 and is ejected onto the paper ejection tray 621. On the other hand, in the two-sided copying mode, the left end of the switching claw 601 moves upward by means of a solenoid not shown in the drawing, such that the sheet of paper ejected through the paper eject rollers 87 reaches the flipping rollers 603 via the conveyance rollers 602.

When the trailing edge of the paper reaches the paper sensor SE61, the flipping rollers 603 rotate backward. This returns the paper to the printing unit P. The sheet of paper thus returned is sent to the timing rollers 84 via the horizontal conveyance rollers 88a, 88b and 88c, whereupon it waits in standby status.

Where multiple sheets of paper are continuously supplied, the sheets are sequentially conveyed at certain intervals such that they do not overlap, and are then sent to the paper resupply unit 600. Since the length of the paper conveyance path is unchanged, the number of sheets traveling in one cycle from the paper resupply unit 600 to the horizontal conveyance rollers 88a through 88c (the maximum number of cycling sheets) depends on the paper size.

Figure 2:
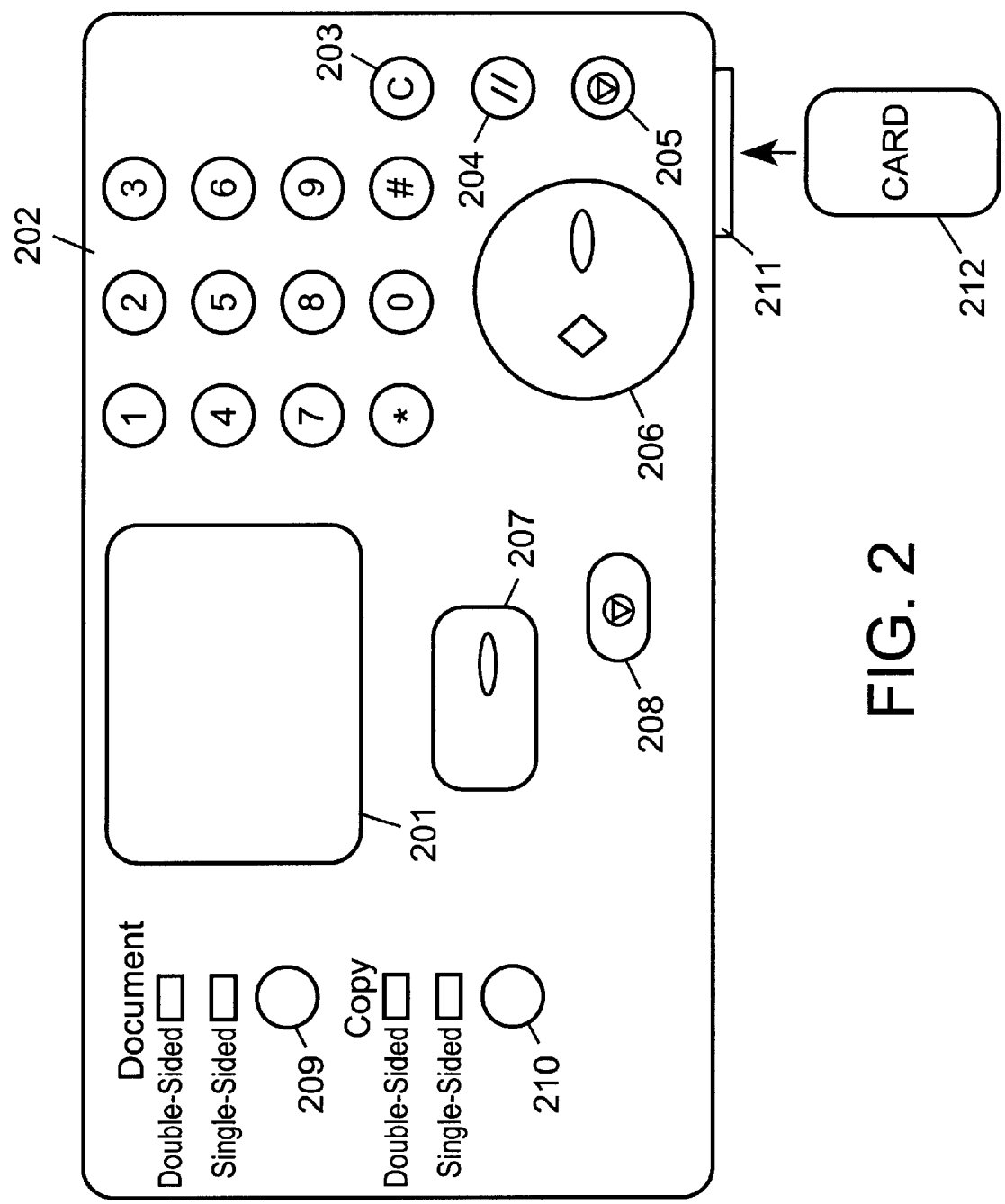
FIG. 2 is a plan view of the operation panel of the digital copying machine shown in FIG. 1.

FIG. 2 is a plan view of the operation panel of the digital copying machine shown in FIG. 1. On the operation panel are located a liquid crystal touch panel 201 to display the status and to set various modes, a numeric keypad 202 to input the numerical copying conditions (the number of copies and the magnification), a clear key 203 to return the numerical settings to their default values, a panel reset key 204 to initialize the copy modes, a stop key 205 to instruct the apparatus to discontinue the copying operation, a start key 206 to instruct the apparatus to commence copying, an original document designation key 209 to designate whether the original document is one-sided or two-sided, a copy mode key 210 to alternate between two-sided copying and one-sided copying, and an interrupt key 208 to input interrupt activation and recovery. An ID card insertion slit 211 to insert an ID card 212 is also located on the operation panel.

This digital copying machine further has a memory recall function to save in the image memory the image data for the image for which printing has been completed and perform printing once again by reading this image data. It also has a serial number printing function to allocate a control number to each of multiple sets of printed images. The operator can select these functions by operating the prescribed touch keys displayed on the liquid crystal touch panel 201 (not shown in FIG. 2).

Figure 3:
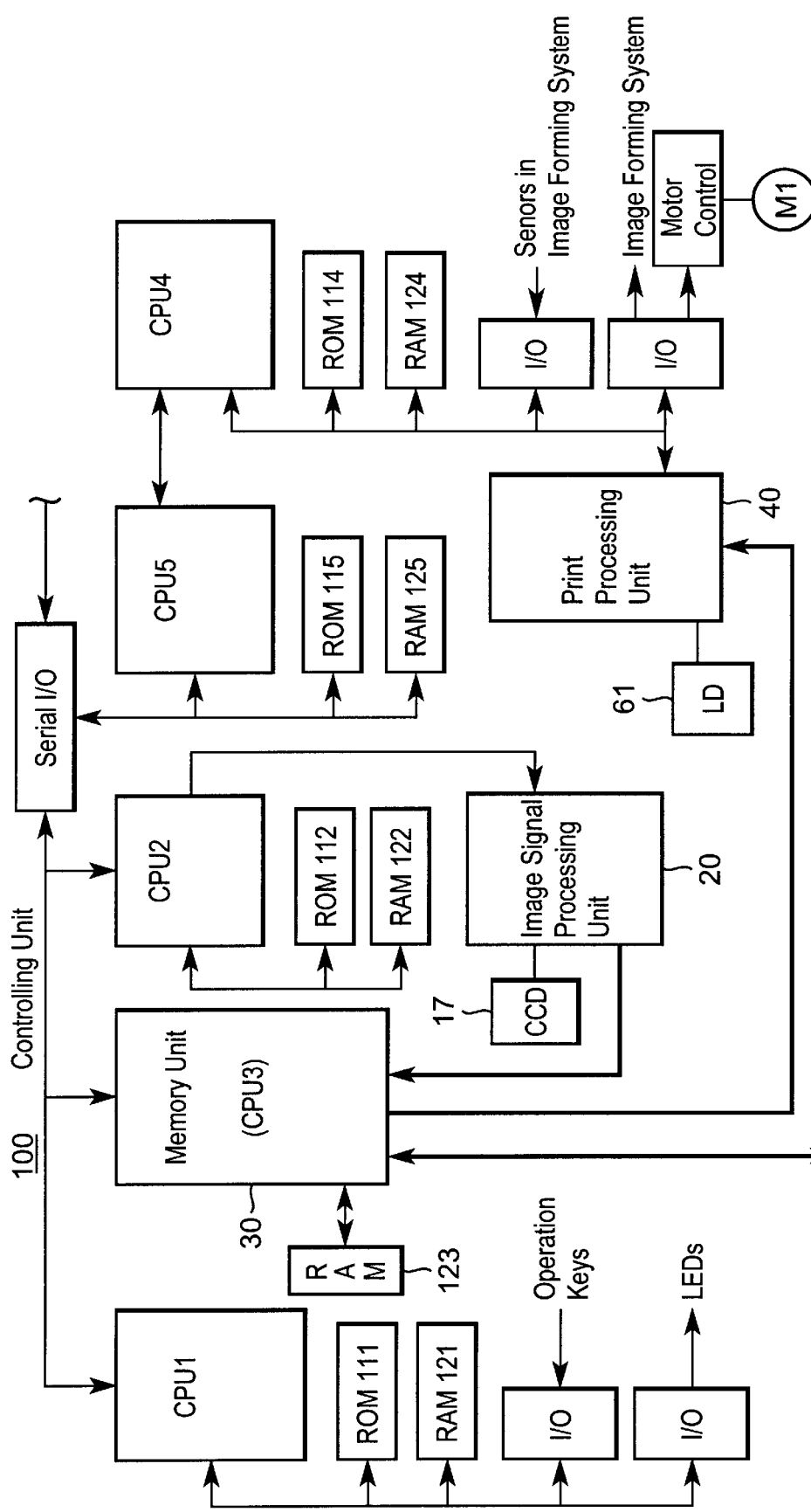
FIG. 3 is a first block diagram showing the construction of the controller 100 of the copying machine.
Figure 4:
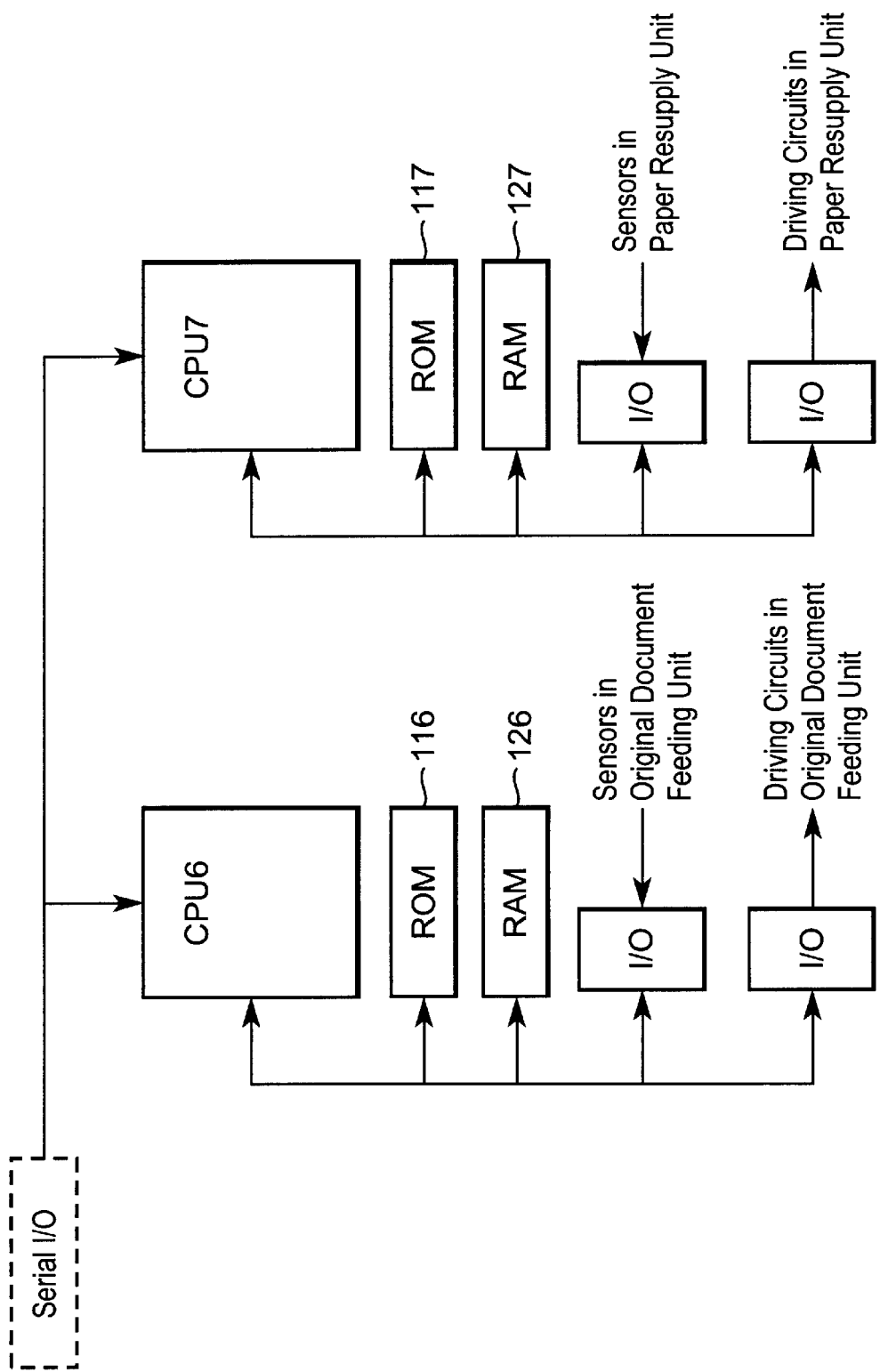
FIG. 4 is a second block diagram showing the construction of the controller 100 of the copying machine.

FIGS. 3 and 4 are block diagrams showing the construction of the controlling unit 100 of the copying machine.

With reference to FIGS. 3 and 4, the controlling unit 100 comprises mainly seven CPUs 1 through 7. These CPUs 1 through 7 each have ROMs 111 through 117 in which programs are stored and RAMs 121 through 127 used as work areas for the execution of programs. The CPU 3 is located inside the memory unit 30.

The CPU 1 performs control regarding the input of signals from the various operation keys on the operation panel as well as control regarding the display on the liquid crystal touch panel 201. The CPU 2 performs control regarding the components of the image signal processing unit 20 and the driving of the scanning system 10. The CPU 4 performs control regarding the print processing unit 40, the laser optical system 60, and the image forming system 70. It also performs control regarding the main motor M1. The CPU 5 performs overall timing adjustment for the controlling unit 100 and processing for the setting of operation modes.

Figure 6:
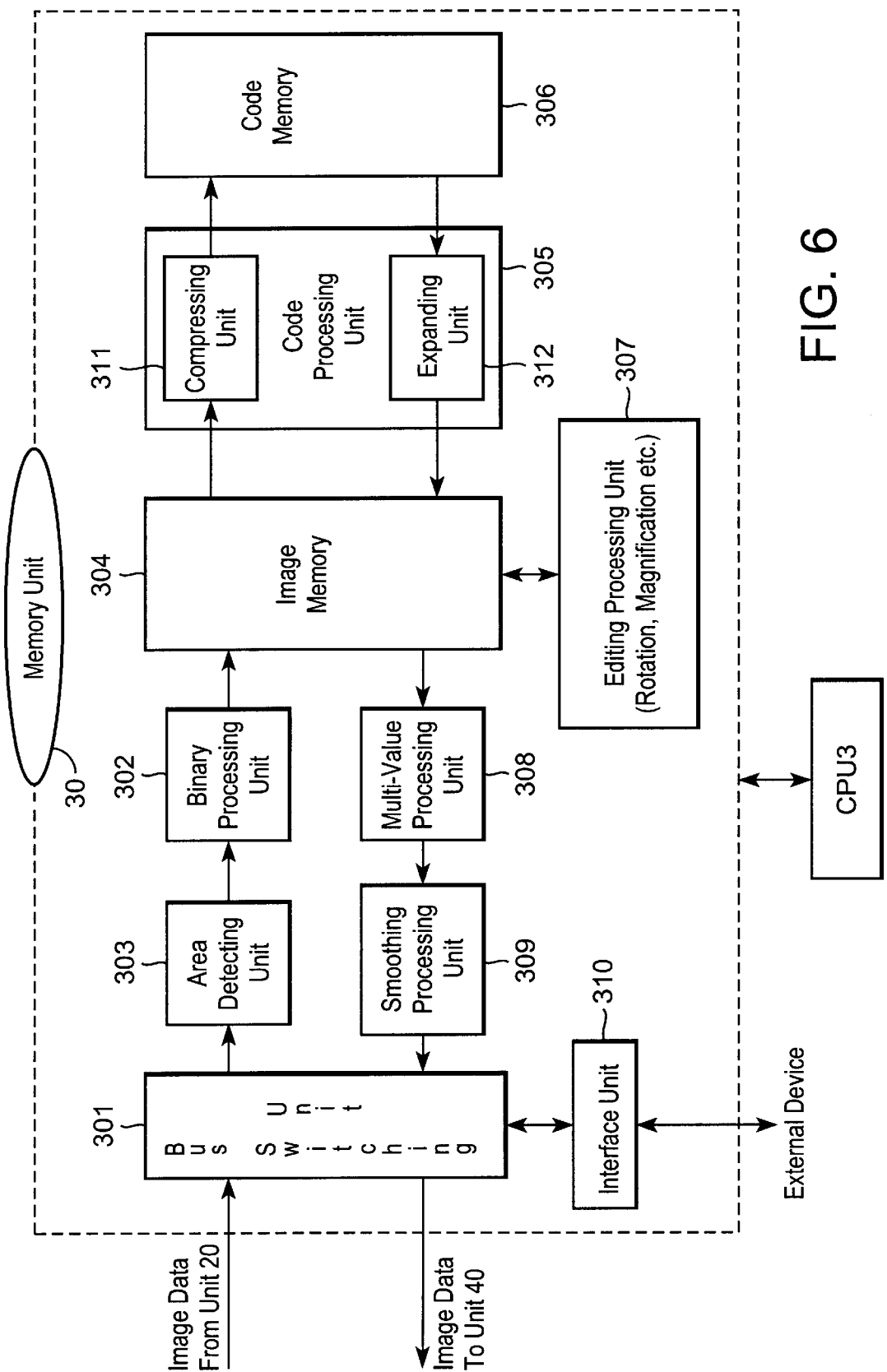
FIG. 6 is a block diagram of the memory unit 30.

The CPU 3 controls the memory unit 30 and stores the image data read in the memory (the image memory unit 304 in FIG. 6). It then reads the data out and sends it to the print processing unit 40. The memory unit 30 has a function to interface with an external device. The transfer of image data and control data is carried out via the memory unit 30.

The signals from the paper size detection sensors SE1 and SE2 are input to the I/O unit controlled by the CPU 4. The size of the copy paper is controlled by the CPU 4.

The CPU 6 performs control regarding the conveyance of original documents by the original document feeding unit 500. The CPU 7 performs control regarding the paper resupply unit 600.

Figure 5:
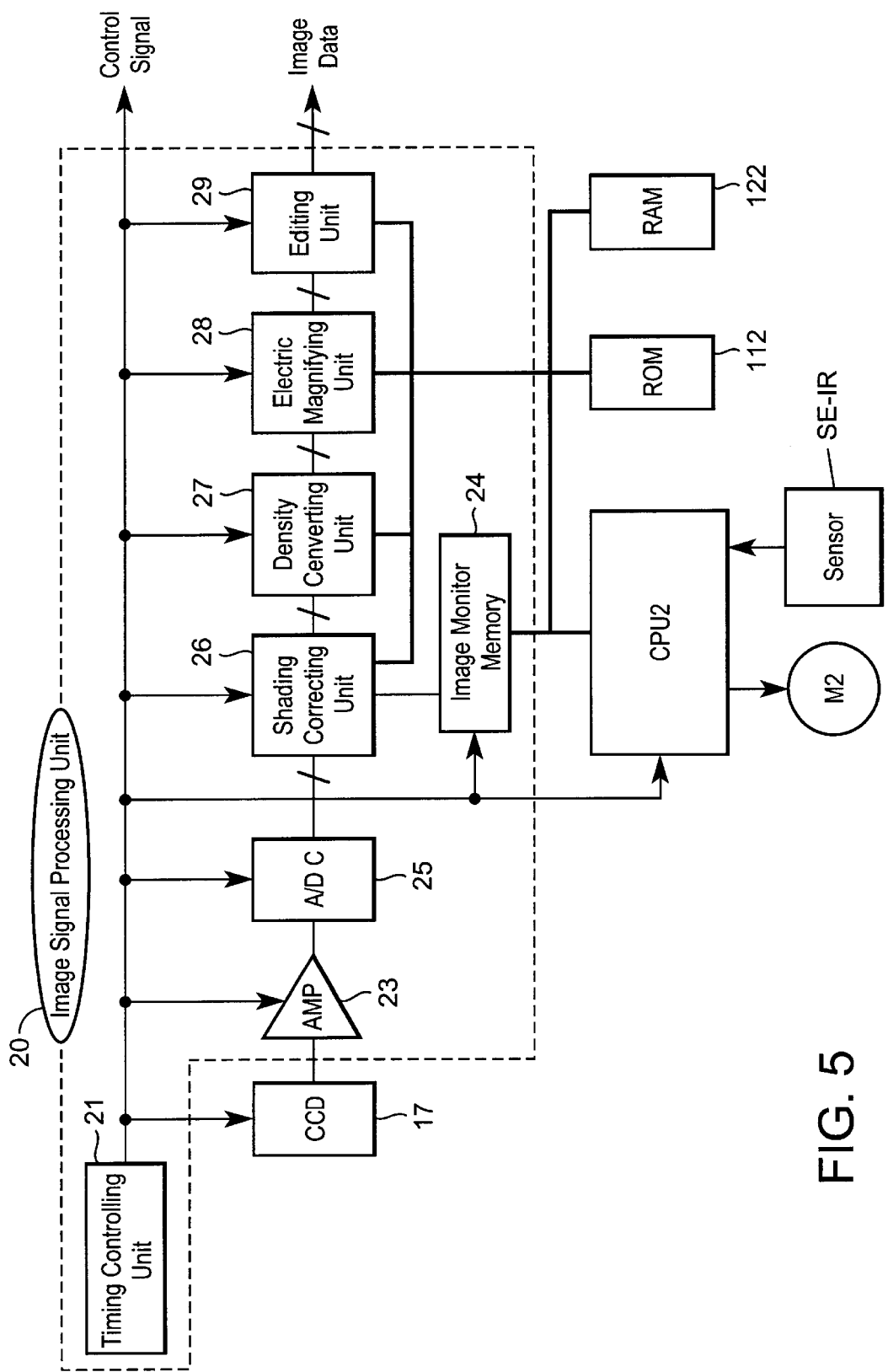
FIG. 5 is a block diagram of the image reader IR and the image signal processor 20.

FIG. 5 is a block diagram of the image reading unit IR and the image signal processing unit 20. In this drawing, the CPU 2, the ROM 112, the RAM 122 and the line sensor (CCD) 17 are those shown in FIG. 3. With reference to FIG. 5, image read synchronization signals are supplied to each block by the timing controlling unit 21. The CCD (line sensor) 17 performs photoelectric conversion of the original document information and generates electric signals. These signals are amplified by the amplifier (AMP) 23 and converted into 8-bit digital signals by the A/D converter 25. These signals are processed by the shading correcting unit 26 such that distortion due to the optical system or the CCD is eliminated. Processing to convert the reflection data into density data, as well as gamma correction, are performed by the density converting unit 27.

The signals output from the density converting unit 27 are input to the electric magnifying unit 28, where electric magnification is carried out with regard to the main scanning directions based on the existing magnification information. Thereafter, the image data edited by the editing unit 29 is supplied to the printing unit P or the memory unit 30.

The image monitor memory 24 saves image data for one line based on instructions from the CPU 2. The CPU 2 performs overall control regarding the image reading unit IR, including the setting of parameters to the units 26 through 29, scan control through the driving of the scanner motor M2 and communication of the timing controller with the CPU 5 (the host CPU).

FIG. 6 is a block diagram of the memory unit 30. With reference to FIG. 6, the memory unit 30 comprises a bus switching unit 301 that alternates the route for the image data among the image signal processing unit 20, the print processing unit 40 and the interface unit 310, an area determining unit 303 that determines binary areas from half-tone areas of the input image data, a binary processing unit 302 that generates binary image data based on the parameter settings from the CPU 3, an image memory 304 having a capacity for two pages, a code processing unit 305 having a compressing unit 311 and an expanding unit 312 that can operate independently of each other, a multi-port code memory 306 having a capacity for large number of pages, an editing processing unit 307 that performs rotation, magnification and relocation, a multi-value processing unit 308 that generates multi-value image data from binary data stored in image memory 304 based on the parameter settings from the CPU 3, a smoothing processing unit 309 that performs smoothing, and a CPU 3 that performs overall control regarding these components.

The bus switching unit 301 can transmit and receive image data to and from an external device via the interface unit 310. Transmission of image data between the code memory 306 and the interface unit 310 can take place at the same time as the copying process taking place in the main unit. When that is done, the image data is compressed or expanded by the code processing unit 305 if necessary.

When copying is performed in the memory mode in which the image read via the scanning of the original document or the image input via the interface unit 310 from an external device is saved before it is used, 8-bit multi-value image data is input to the binary processing unit 302 of the memory unit 30 from the image signal processing unit 20 via the bus switching unit 301 and the area determining unit 303. The binary processing unit 302 performs processing to convert the multi-value image data into binary image data to the recoverable extent possible using the error dispersion method or the dithering method. The binarized image data is written to the image memory 304.

When the image data is written in the image memory 304, the code processing unit 305 reads the data and compresses it to generate code data (compressed data). The code processing unit 305 then writes the code data in the code memory 306. The code processing 305 also reads the code data, which is the object of printing, from the code memory 306 and expands it. It then writes the image data thus obtained in the image memory 304. The compressing unit 311 and the expanding unit 312 can operate simultaneously and independently of each other in order to increase the copying speed. Data is transmitted between these devices and the code memory 306 using DMA transfer by means of a DMA controller not shown in the drawings.

When expanded image data is transmitted to the image memory 304, editing of the expanded image data, such as rotation and/or magnification, is performed if necessary by the editing processing unit 307. Where the serial number printing mode is selected, the editing processing unit 307 synthesizes image data that corresponds to the serial number to be allocated to the expanded image data.

When image data for one page is reproduced through expansion and editing, the data is read from the image memory 304. The data thus read is recovered as multi-value data by the multi-value processing unit 308 and the smoothing processing unit 309, depending on the mode present, and undergoes smoothing if necessary. This multi-value image data is transmitted to the print processing unit 40 or to an external device via the interface unit 310.

When the original document image is temporarily saved in this way, the code memory 306 is managed using the management table MT1 stored in the RAM 123.

Figure 7:
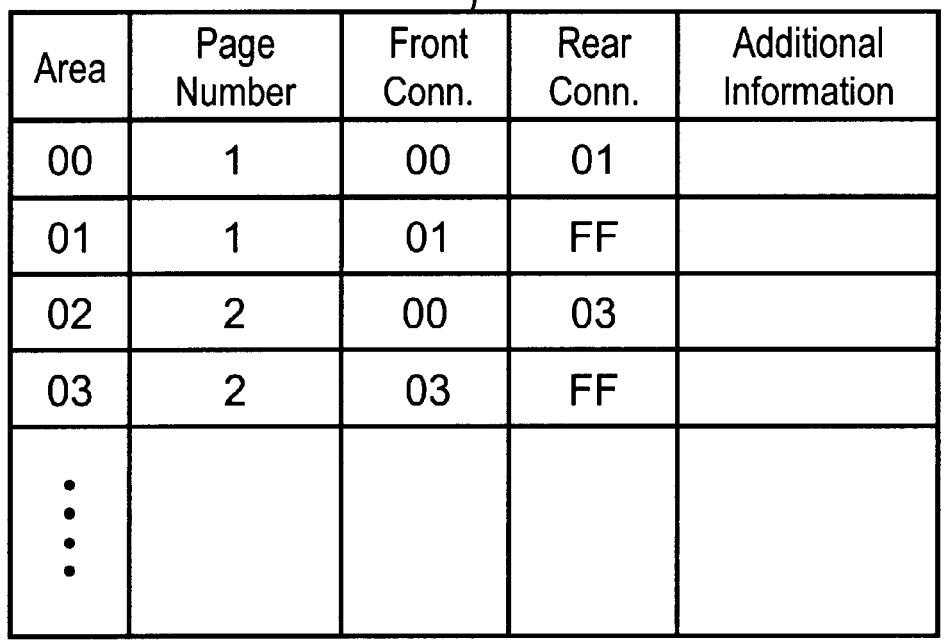
FIG. 7 is a first drawing showing the relationship between the management table MT1 and the number memory unit 306.
Figure 8:
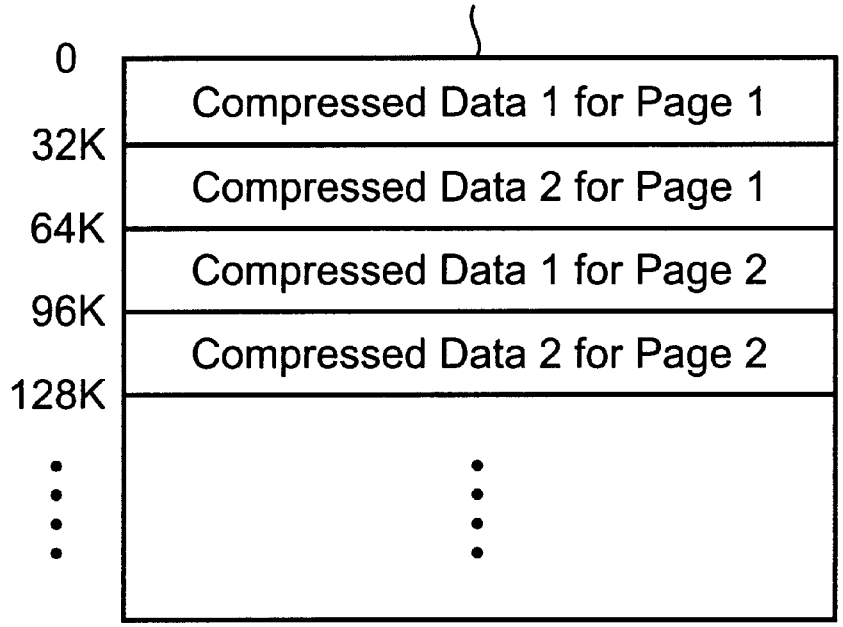
FIG. 8 is a second drawing showing the relationship between the management table MT1 and the number memory unit 306.

FIGS. 7 and 8 show the relationship between the management table MT1 and the code memory 306. The code memory 306 is divided into 32K memory areas. In order to make simultaneous writing (when an image is read) and reading (when printing is performed) possible, each area houses code data for each page.

Stored in the management table MT1 are the number that indicates the area in the code memory 306, the page number PN for the image data, which is provided in the order of writing (the order of the scanning of the sheets of the original document), the number of the associated area, and various additional information necessary for the compression and expansion processes, such as the method of compression and the data size. The code memory 306 is actively managed based on this information.

The 'front connection' in FIG. 7 indicates the relationship to the previous 32K area for page data. Where it is '00', it means that the area is the first storage area for one-page data. The 'rear connection' similarly indicates the relationship to the next 32K area for page data. Where it is 'FF', it indicates that the area is the last area and where it is something other than 'FF', it indicates the number of the subsequent area.

When the compressing unit 311 reads image data from the image memory 304 and compresses it, the CPU 3 controls the compressing unit 311 with reference to the information in the management table MT1 and stores the image data in the code memory 306. When the image data is output, the code data is read from the code memory 306 via a reverse operation.

Figure 9:
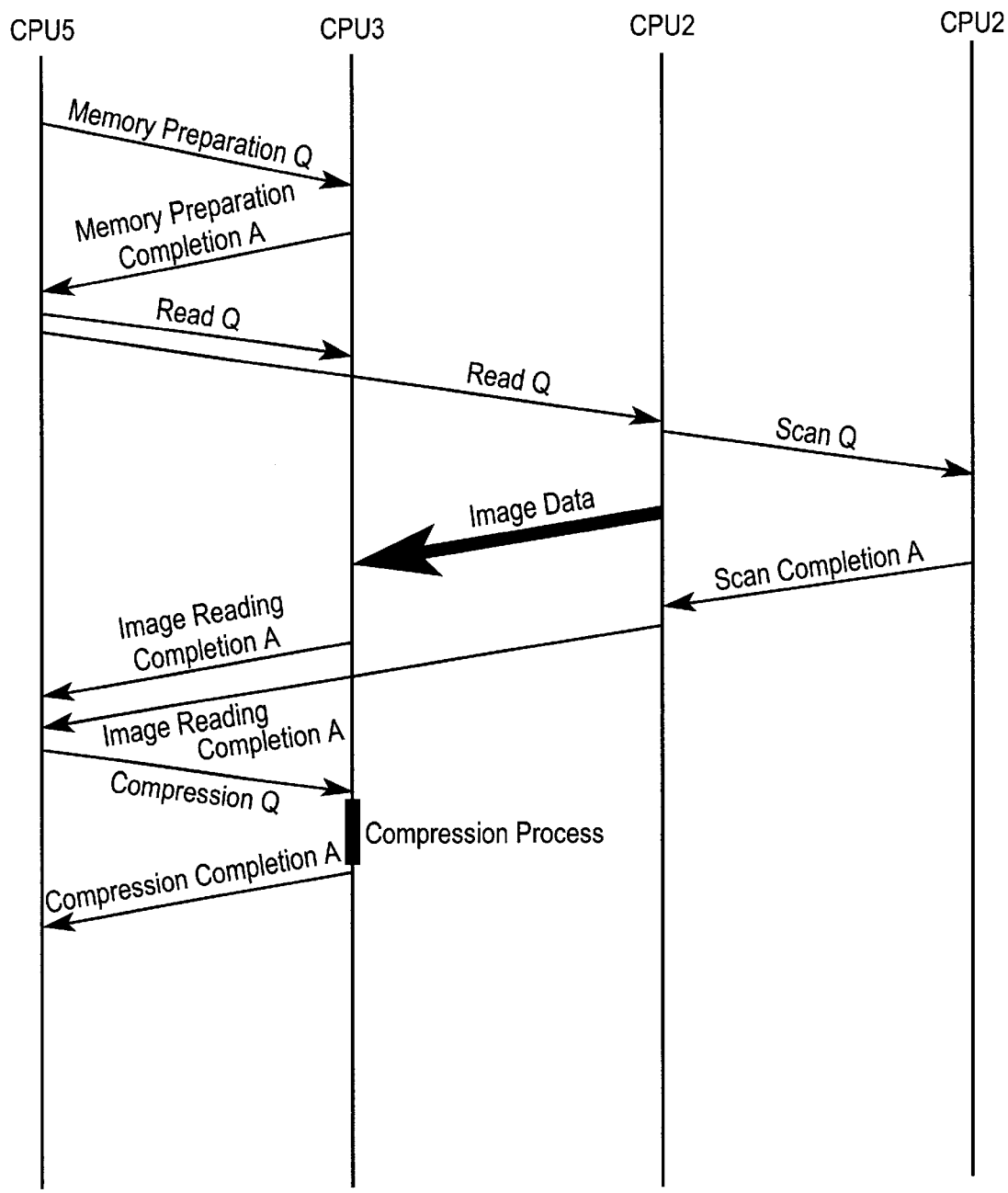
FIG. 9 is a drawing showing the sequence of the memory write operation in a simplified fashion.

The operation sequence of this digital copying machine will now be explained with a focus on the request commands (Q) and the reports (A) that are sent and received between the CPUs, or the data flow. FIG. 9 shows the sequence of the memory write operation in a simplified fashion. In the write operation, image data is transmitted from the image signal processing unit 20 to the image memory 304.

With reference to FIG. 9, the CPU 5, which controls the overall sequence, first sends a memory preparation request to the CPU 3. Upon receiving the request, the CPU 3 sets in the internal hardware components the bus connection to transmit the image data from the image signal processing unit 20 to the image memory 304, the mode for binarization, and the first write area address in the image memory 304 and XY length information.

When these settings are made and preparation is completed, the CPU 3 notifies the CPU 5 of the completion of the memory preparation.

When the CPU 5 sends a read request to the CPU 3 and the CPU 2, the CPU 2 sends a scan request to the internal original document scanning unit.

When the original document scanning unit begins scanning and the first scanner 11 reaches the image area, the read data (the image data) is transmitted from the image signal processing unit 20 to the memory unit 30 depending on the image processing mode set by the CPU 2.

When the scanning is completed and the CPU 2 and the CPU 3 notify the CPU 5 of the completion of reading, the CPU 5 sends a data compression request to the CPU 3. Upon receiving this request, the CPU 3 sets the read address from the image memory 304, the XY length information, the write address in the code memory 306, and the compressing unit 311 mode (such as arithmetic encoding method or MH method, for example), and activates various components. In this way, compression takes place and code data is saved in the code memory 306.

When the compression process is completed, the CPU 3 notifies the CPU 5 of the completion of compression. If the code memory 306 is full when the notification is made, a compression completed report including a parameter indicating compression disabled is sent to the CPU 5. As a result, the CPU 5 learns that the code memory 306 is full.

Figure 10:
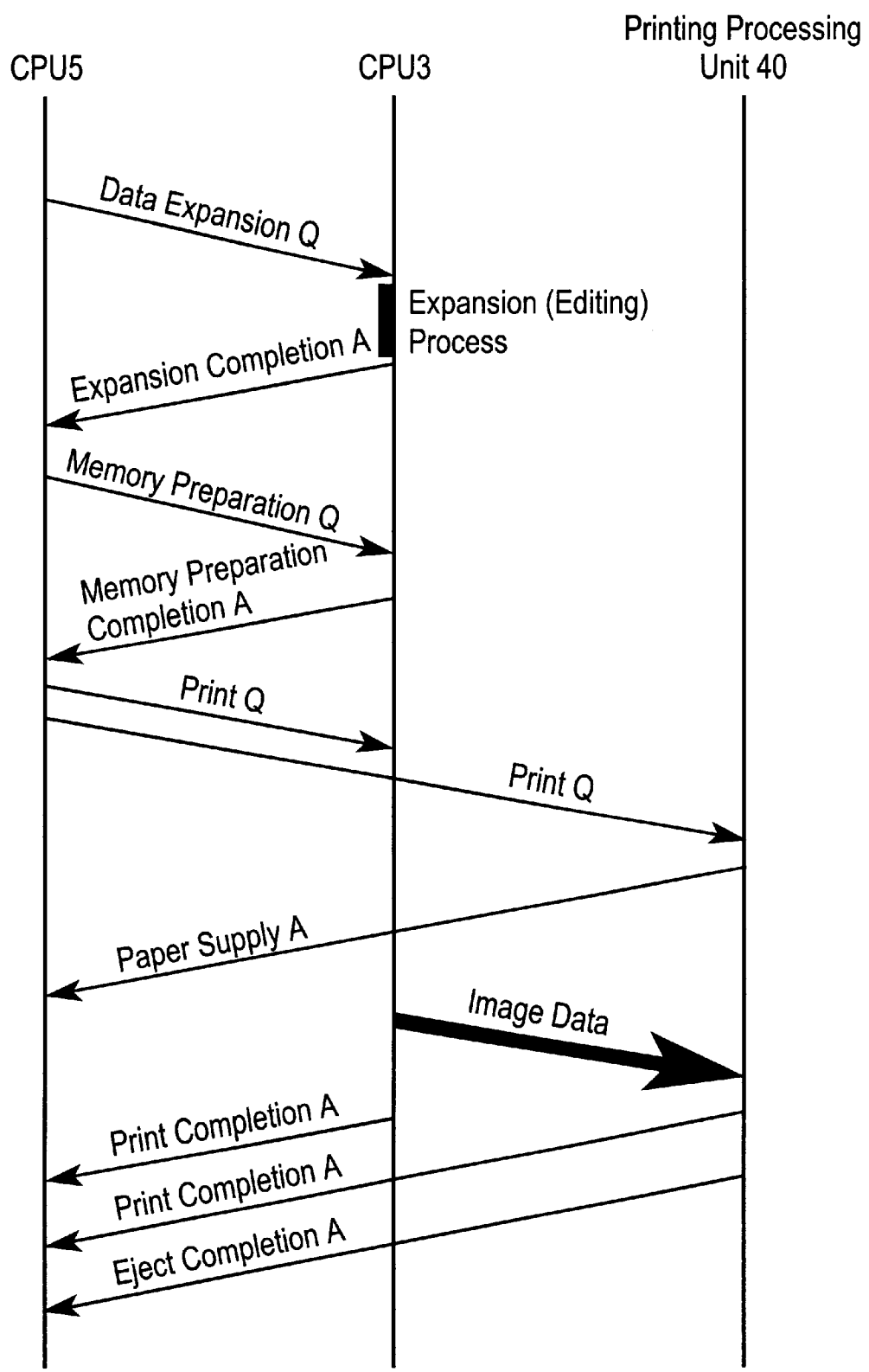
FIG. 10 is a drawing showing the sequence of the memory read operation in a simplified fashion.

FIG. 10 shows the sequence of the memory read operation in a simplified fashion. In the memory read operation, image data is read from the image memory 304 and a copy image is printed on the sheet of paper based on the image data. To describe it in more detail, with reference to FIG. 10, the CPU 5 sends a data expansion request to the CPU 3. The CPU 3 sets the read address from the code memory 306, the data size, the write address in the image memory 304, the XY length information, the expanding unit 312 mode (such as arithmetic encoding method or MH method, for example), and the editing mode such as rotation, and activates various components. In this way, expansion takes place and the image data is saved in the image memory 304.

When the expansion process is completed, a completion report is sent from the CPU 3 to the CPU 5. The CPU 5 then outputs to the CPU 3 a memory preparation request to read the image data from the image memory 304. Upon receiving this request, the CPU 3 sets in the internal hardware components the bus connection to transmit the image data from the image memory 304 to the print processing unit 40, the first read area address in the image memory 304 and the XY length information.

When setting of these parameters is completed and the CPU 5 is notified of the completion, the CPU 5 sends a print request to the CPU 3 and the print processing unit 40.

A paper supply report regarding the paper conveyance is sent from the print processing unit 40 to the CPU 5, and then the image data read from the image memory 304 is output to the print processing unit 40, whereupon printing is carried out.

When printing is completed, the CPU 3 and the print processing unit 40 send a print completed report and an eject completed report to the CPU 5. Upon receiving these reports, the CPU 5 sends a memory clear request to the CPU 3 if necessary.

Figure 11:
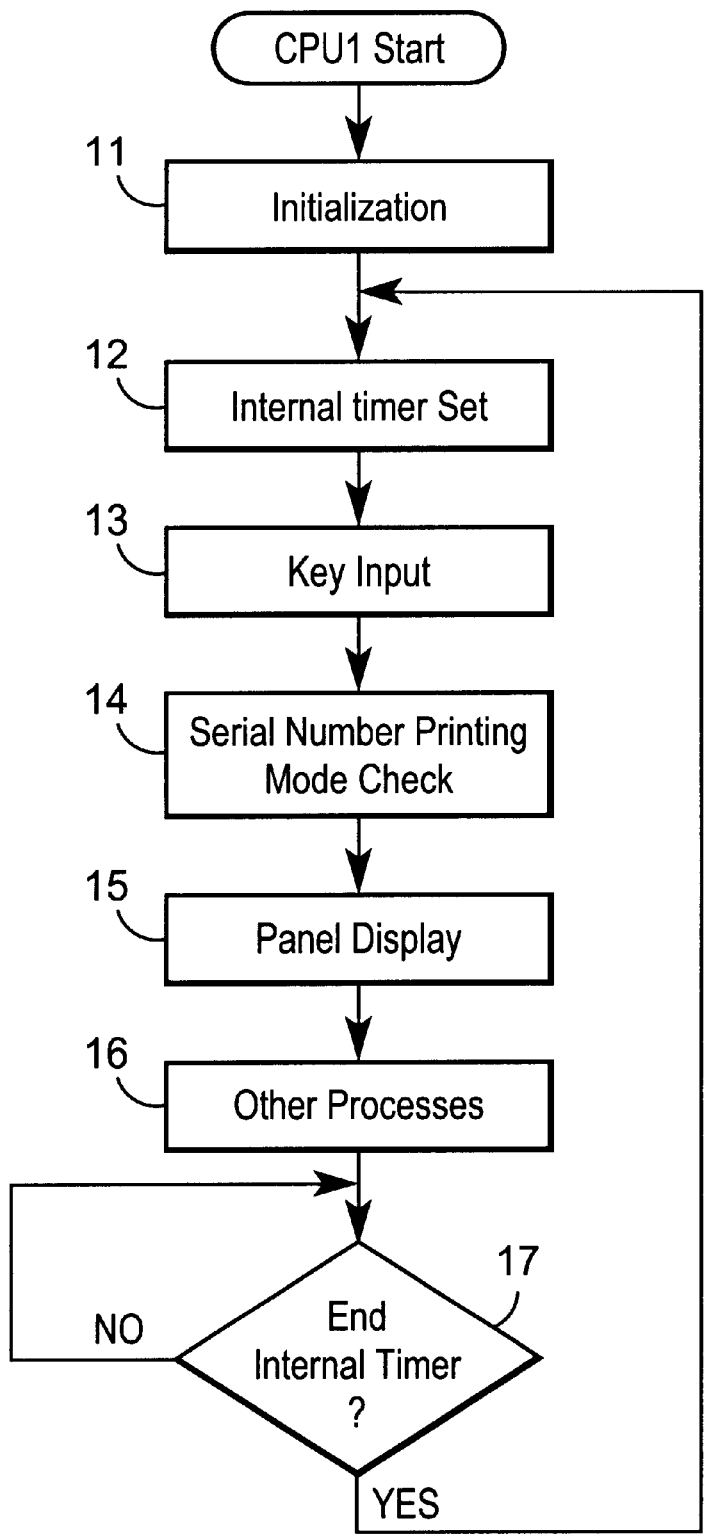
FIG. 11 is a main flow chart for the CPU 1 that controls the operation panel.

The control by the CPU 1 and the CPUs 3 through 5 pertaining to the present invention will now be explained with reference to FIGS. 11 through 16. FIG. 11 is a main flow chart for the CPU 1 that performs control regarding the operation panel.

When power is turned ON, the CPU 1 first performs initialization to initialize the RAM, registers, etc. (step #11). It then sets the internal timer that regulates the length of one routine (step #12) and repeats the key input routine in which key operations are accepted (step #13), the serial number printing mode checking routine in which it is determined whether the serial number printing mode is selected (step #14), the panel display routine in which display in response to the operation is performed (step #15), other routines (#16), and the waiting for the internal timer to come to an end (step #17). It also communicates with other CPUs in the form of an interrupt routine where necessary.

The key input routine (step #13) and the serial number printing mode checking routine (step #14) will be explained in detail below.

Figure 12:
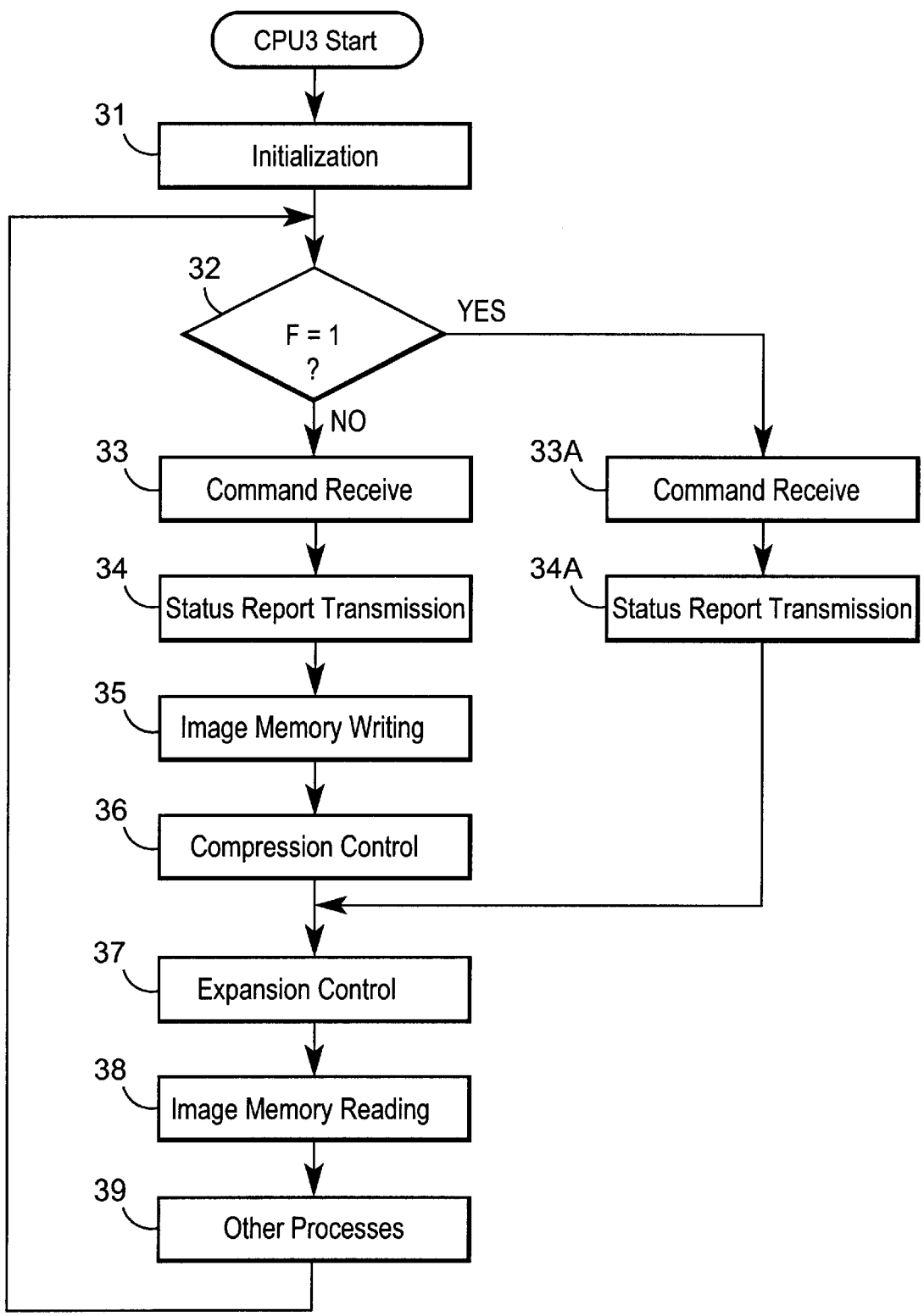
FIG. 12 is a main flow chart for the CPU 3 that controls the memory unit 30.

FIG. 12 is a main flow chart for the CPU 3 that performs control regarding the memory unit 30. After performing initialization (step #31), the CPU 3 determines whether or not the memory recall key flag F is '1'. The memory recall key flag F is set to '1' when the memory recall mode is selected in the key input routine shown in FIG. 15, and is set to '0' when the memory recall mode is not selected.

Where the memory recall key flag F is 0, (NO in step #32), the command receive routine (step #33), the status report transmission routine (step #34), the image memory write routine (step #35), and the compression control routine (step #36) are performed, followed by the expansion control routine (step #37), the image memory read routine (step #38) and other routines (step #39).

On the other hand, where the memory recall key flag F is '1' (YES in step #32), the command acceptance routine (step #33A) and the status report transmission routine (step #34A) are performed, followed by the expansion control routine (step #37), the image memory read routine (step #38) and the other routines (step #39).

The difference in processing regarding the memory unit 30 between when the memory recall mode is selected and when it is not selected is that, in the memory recall mode, the image data is stored in the memory and the image is formed directly using this image data, and the routine to write the image in the memory (step #35) and the routine to compress the image (step #36) are not necessary.

Figure 13:
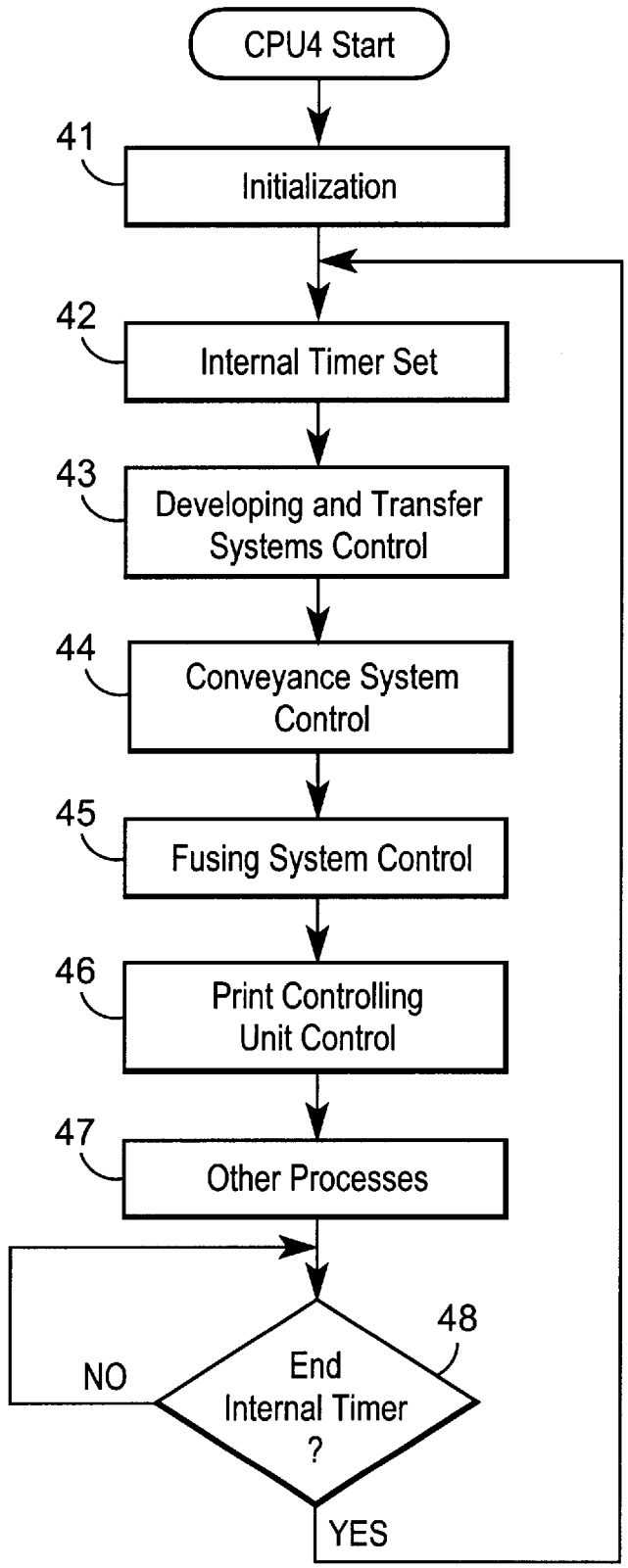
FIG. 13 is a main flow chart for the CPU 4 that controls the printer P.

FIG. 13 is a main flow chart for the CPU 4 that performs control regarding the printing unit P. After performing initialization (step #41), the CPU 4 repeats the setting of the internal timer (step #42), the control regarding the developing and transfer systems (step #43), the control regarding the conveyance system (step #44), the control regarding the fusing system (step #45), the control regarding the print processing unit (step #46), other routines (step #47) and the waiting for the internal timer to come to an end (step #48).

Figure 14:
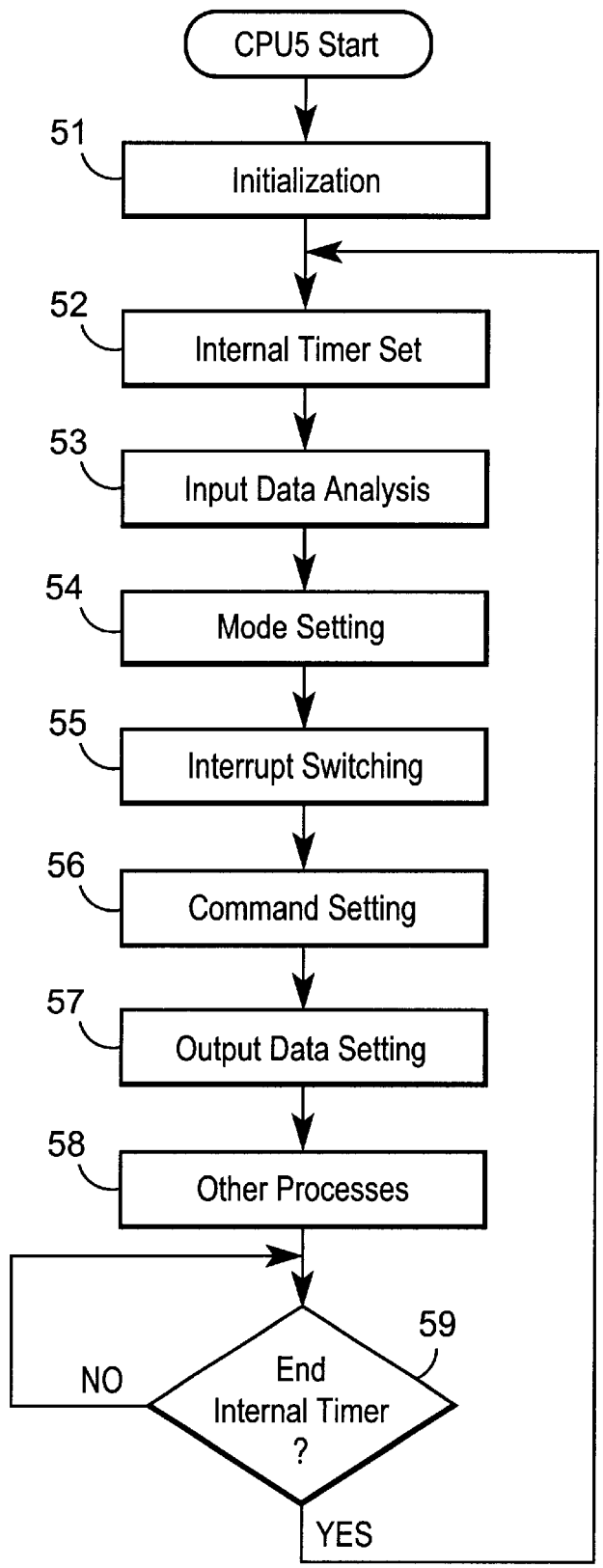
FIG. 14 is a main flow chart for the CPU 5 that governs the control of the copying machine.

FIG. 14 is a main flow chart for the CPU 5 that oversees the control regarding the copying machine. After performing initialization (step #51), the CPU 5 repeats the setting of the internal timer (step #52), the input data analysis routine in which the data input from other CPUs is checked (step #53), the mode setting routine in which the operation mode is determined depending on the parameters set (step #54), the interrupt switching routine (step #55), the command setting routine in accordance with the mode (step #56), the output data setting in which a command is placed standing-by in the communication port (step #57), the other routines (step #58) and the waiting for the internal timer to come to an end (step #59).

The key input subroutine in step #13 and the serial number printing mode checking subroutine in step #14 of FIG. 11 will now be explained.

Figure 15:
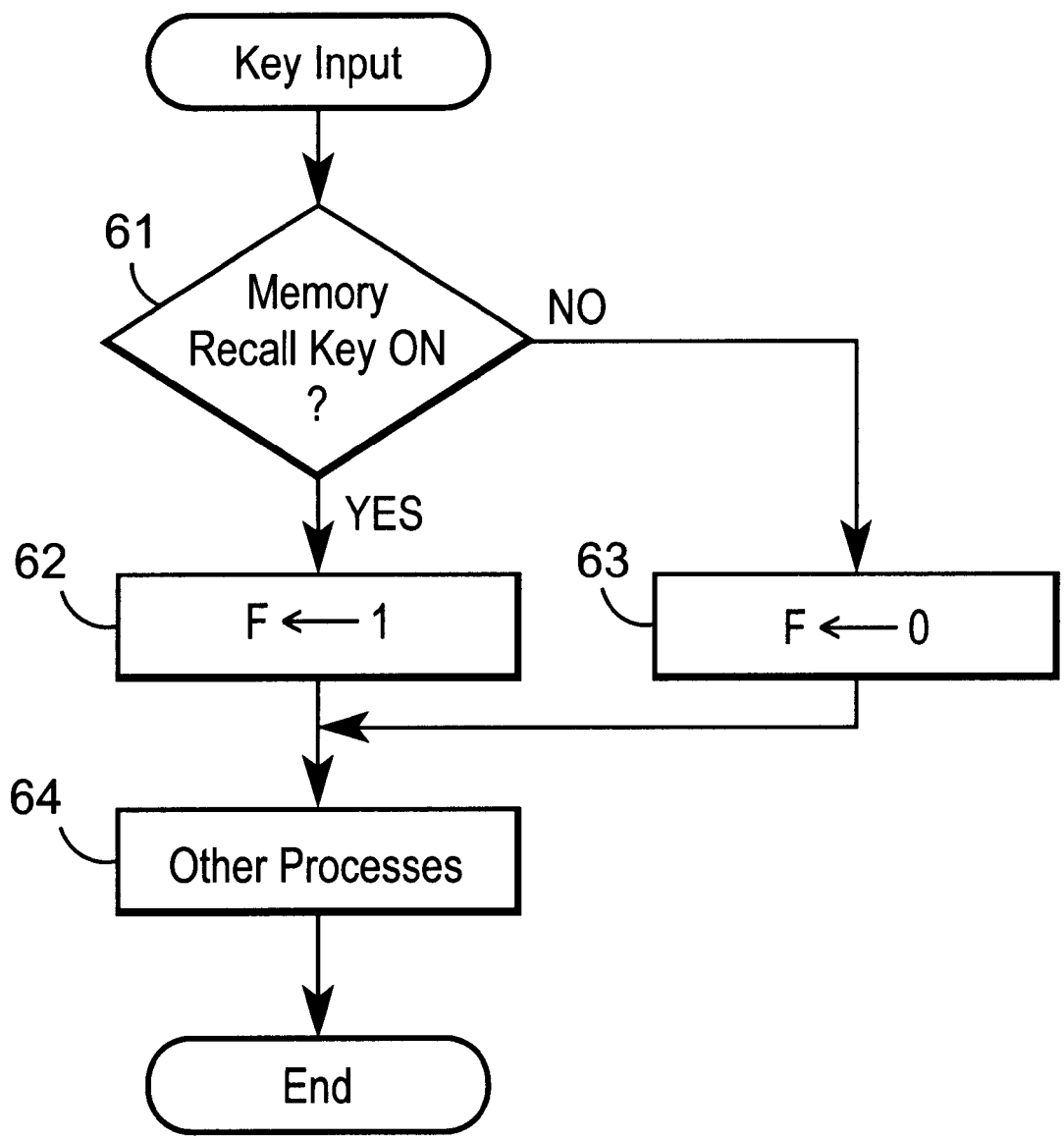
FIG. 15 is a flow chart showing the sequence of the processes of the key input subroutine in step #13 of FIG. 11.

FIG. 15 is a flow chart showing the sequence of the processes of the key input subroutine in step #13 of FIG. 11. When the display shown in FIG. 17 (c) is shown on the liquid crystal touch panel 201, it is determined in the key input routine whether or not the 'memory recall' key 2011, which is a touch key, has been pressed in step #61. Where the 'memory recall' key 2011 has been pressed (YES in step #61), the memory recall key flag F is set to '1' in step #62. Where the 'memory recall' key 2011 has not been pressed (NO in step #61), the memory recall key flag F is set to '0' in step #63. The other routines are performed in step #64.

When these processes are performed, this key input routine comes to an end. The status of the memory recall key flag F is communicated to the CPU 3 via the CPU 5 in the transmission process included in the other routines of step #64.

Figure 16:
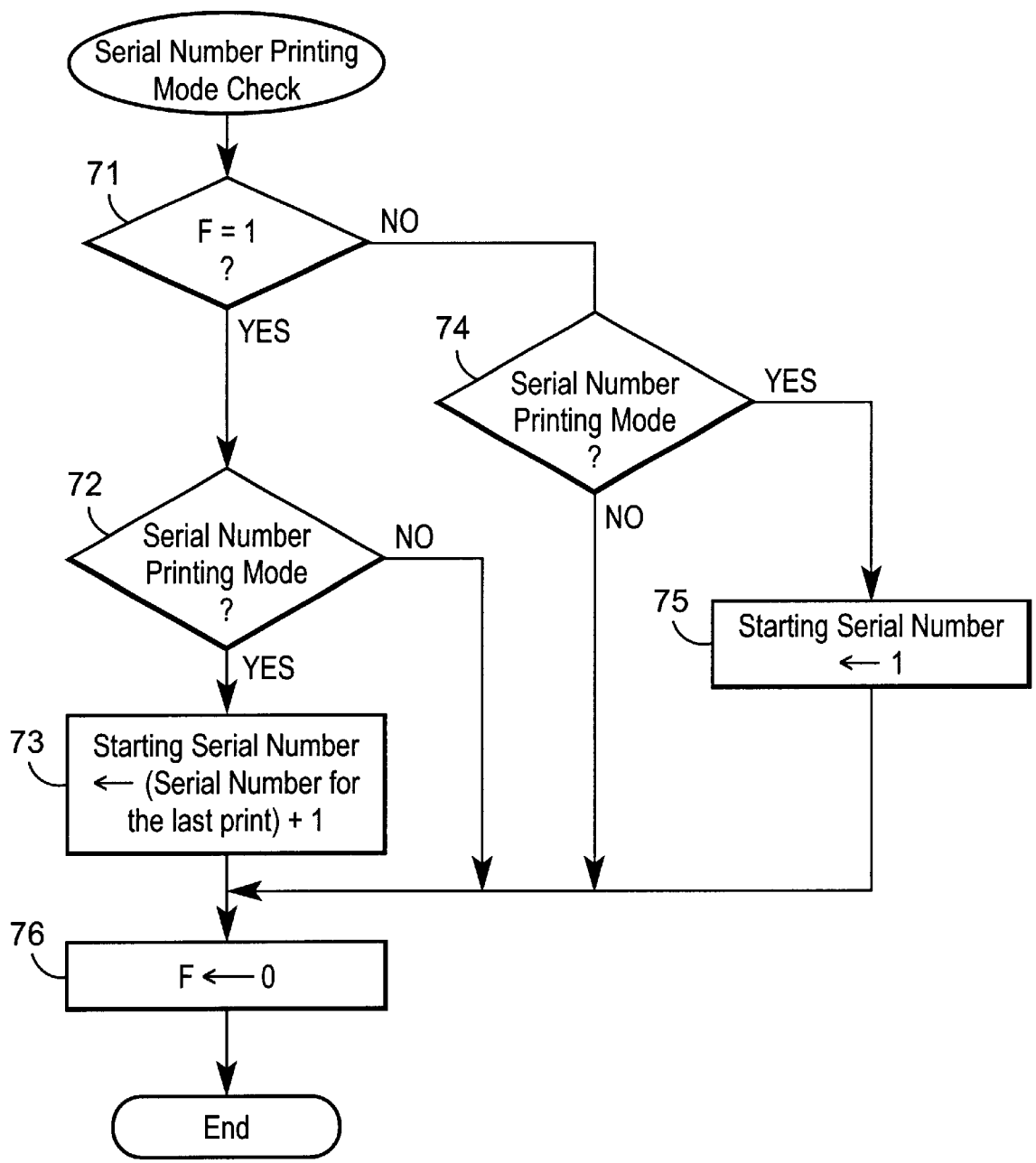
FIG. 16 is a flow chart showing the sequence of the processes of the serial number printing mode checking subroutine in step #14 of FIG. 11.

FIG. 16 is a flow chart showing the sequence of processes of the serial number printing mode checking subroutine in step #14 of FIG. 11. In the serial number printing mode checking routine, it is first determined in step #71 whether or not the memory recall key flag F is '1'. Where the memory recall key flag F is '1' (YES in step #71), it is determined in step #72 whether or not the serial number printing mode is selected. The selection of the serial number printing mode is carried out by pressing the 'serial number print' key 2012, which is a touch key, when the display shown in FIG. 17 (d) is shown on the liquid crystal touch panel 201. If the memory recall key flag F is '1' (i.e., the memory recall mode is selected) and the serial number printing mode is selected (YES in step #72), a number comprising the last management number allocated to the immediately prior print job plus one is set as the starting serial number (the first serial number that starts the set of serial numbers allocated to the print job to manage the number of sets of printed images) in step #73, and this number is communicated to the CPU 3 via the CPU 5.

On the other hand, where the memory recall flag F is '0' (NO in step #71), it is determined in step #74 whether the serial number printing mode is selected. If the memory recall key flag F is '0' (i.e., if the memory recall mode is not selected) and the serial number printing mode is selected (YES in step #74), 1 is set as the starting serial number in step #75 and this number is communicated to the CPU 3 via the CPU 5.

After these processes, the memory recall key flag F is set to '0' in step #76, whereupon this serial number printing mode checking routine comes to an end.

Figure 17A:
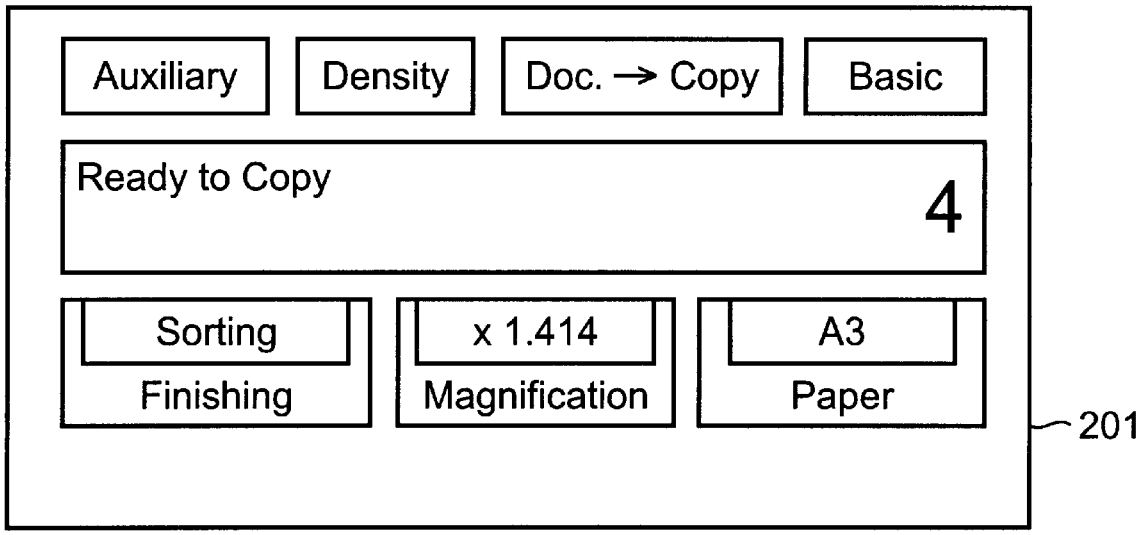
FIGS. 17(a–c) is a drawing to explain the display on the liquid crystal touch panel 201 when serial number printing is performed in the digital copying machine using memory recall.
Figure 17B:
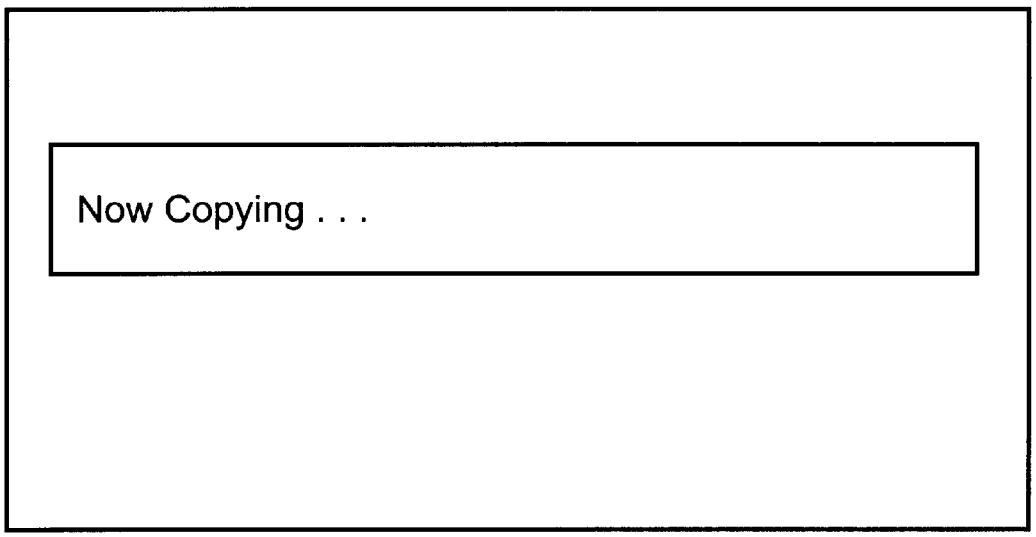
Figure 17C:
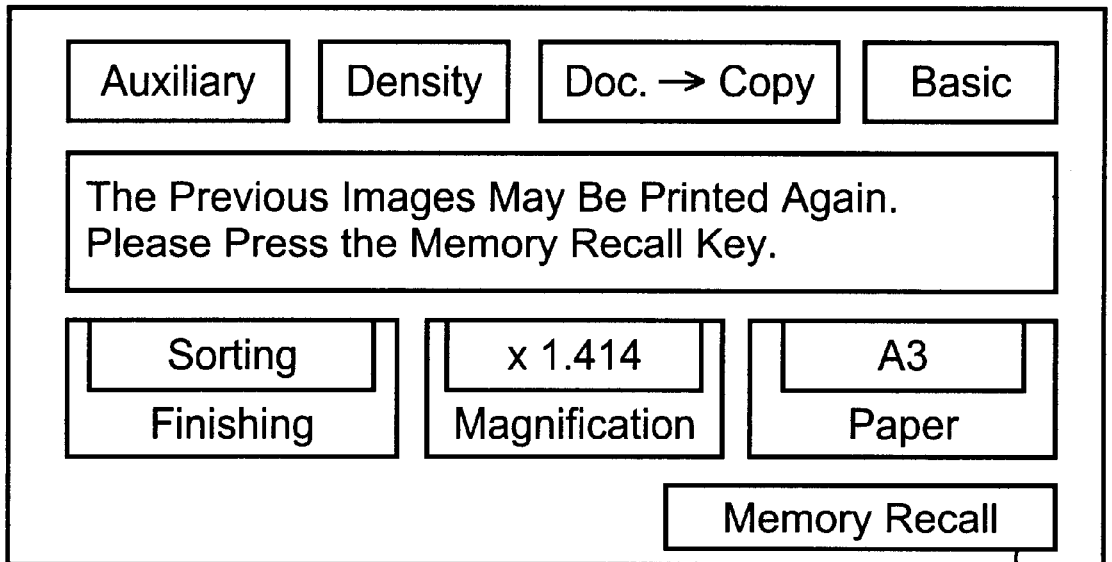
Figure 17D:
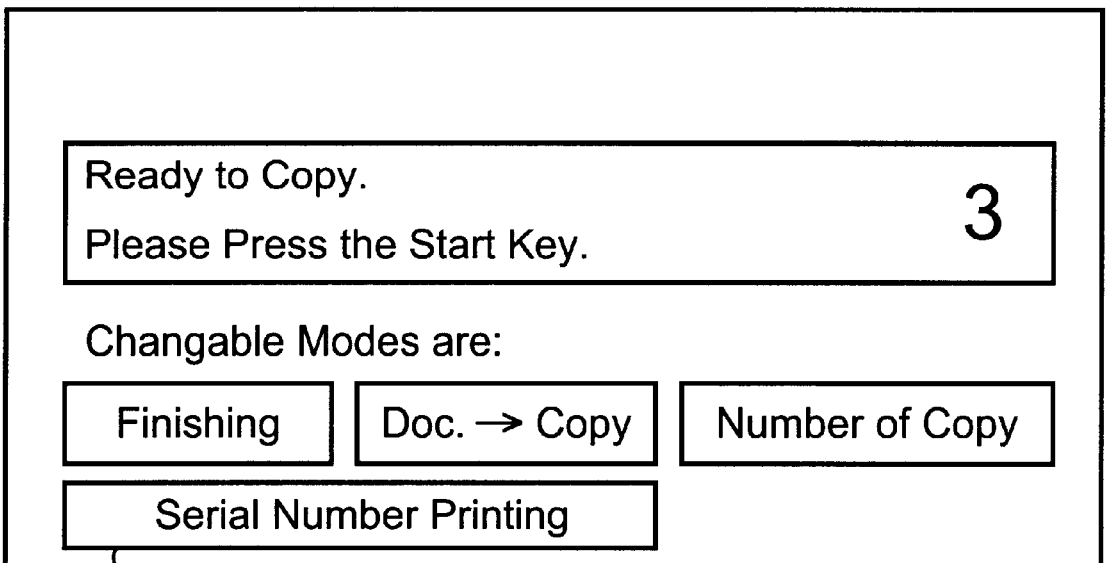
Figure 18A:
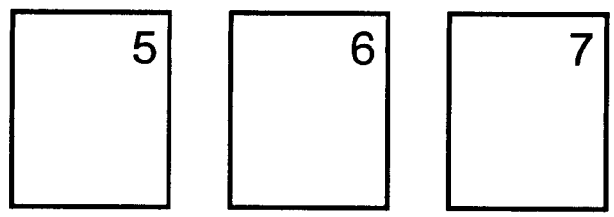
FIGS. 18(a–c) is a drawing to explain the printing of images for which serial numbers are allocated by the digital copying machine using memory recall.
Figure 18B:
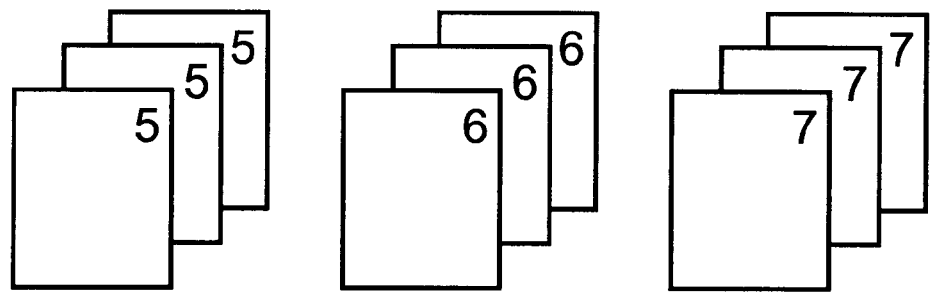
Figure 18C:
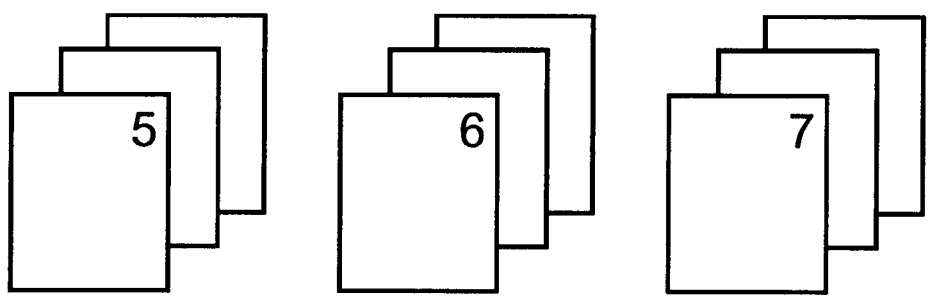

In this digital copying machine, the control described above entails displays on the liquid crystal touch panel 201 that are shown in FIGS. 17(a)–17(d), and printing of images that is explained with reference to FIGS. 18(a)–18(c) is performed through this control.

FIGS. 17(a)–17(d) are drawings to explain the display on the liquid crystal touch panel 201 when serial number printing is performed using the memory recall function in this digital copying machine. It is displayed on the liquid crystal touch panel 201 of this digital copying machine that the user has input '4' as the number of copies to make, as shown in FIG. 17(a), and when copying is started by the pressing of the start key 206, it is displayed that copying is underway, as shown in FIG. 17(b).

When the copying is completed, 'The previous images may be printed again. Please press the memory recall key' is displayed on the liquid crystal touch panel 201, as shown in FIG. 17(c), indicating that the memory recall mode is available. If the user presses the 'memory recall' key 2011 at this point, the memory recall mode is selected and the display of FIG. 17(d) appears.

In the display shown in FIG. 17(d), the number of copies that the user is to make is input as '3'. The 'serial number printing' key 2012 is also displayed, indicating that the serial number printing mode is available. When the user presses the 'serial number printing' key 2012, and then the start key 206 in response to the display 'Starting printing. Please press the start key', serial number printing as shown in FIGS. 18(a)–18(c) is performed.

FIGS. 18(a)–18(c) are drawings to explain the printing of images with serial numbers when the memory recall function is used in this digital copying machine. In this digital copying machine, when four copies of an image are printed using the procedure explained with reference to FIGS. 17(a) and 17(b), and three more copies of the same image are printed using the memory recall function and the serial number printing function via the procedure explained with reference to FIGS. 17(c) and 17(d), management numbers 5, 6 and 7 are allocated to each of the printed images as shown in FIG. 18(a).

It is possible to allocate the same number to multiple different printed images that comprise one set of printed images, as shown in FIG. 18(b), or to allocate the number to a specific image among multiple different printed images comprising a set of printed images, i.e., the printed image that is ejected as the first page of the set of printed images, for example, as shown in FIG. 18(c).

In the digital copying machine of this embodiment, the starting serial number is automatically determined based on the numbers (serial numbers) used in the previous print job, but it is also acceptable if the construction is such that the user can set any number.

Using the digital copying machine of this embodiment explained above, when using stored image data and allocating a number to each set of printed images, the operation by the user is simpler and an operation inconvenient for the user is not necessary, while the number of sets of formed images is accurately managed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In an image forming apparatus which has a memory recall function and a serial number printing function, a controller for the image forming apparatus comprising:

a processor which automatically determines a starting serial number which is to be given to a first set of prints of a second print job in a case where a memory recall function and a serial number printing function are set, the starting serial number being sequential to the last serial number given to a first print job previously executed.

2. The controller of claim 1, further comprising:

an operation panel from which an operator is capable of setting the memory recall function and the serial number printing function.

3. The controller of claim 2, wherein the setting of the serial number printing function for the second print job is allowed after the setting of the memory recall function for the second print job.

4. The controller of claim 1, wherein the first print job is a job executed immediately before the second print job.

5. The controller of claim 1, wherein said processor includes a central processing unit.

6. The controller of claim 1, wherein the memory recall function enables the image forming apparatus to record and save image data for which printing has been completed and to perform printing of this data again by reading the saved image data.

7. In an image forming apparatus which has a memory recall function and a serial number printing function, a controller for the image forming apparatus comprising:

a processor which automatically calculates a starting serial number which is to be given to a first set of prints of a print job in a case where a memory recall function and a serial number printing are set.

8. The controller of claim 7, wherein said processor calculates the starting serial number based on the last serial number given to another print job previously executed.

9. The controller of claim 8, wherein the starting serial number calculated by said processor is sequential to the last serial number given to the another print job.

10. The controller of claim 7, further comprising:
an operation panel from which an operator is capable of setting the memory recall function and the serial number printing function.

11. The controller of claim 10, wherein the setting of the serial number printing function for the print job is allowed after the setting of the memory recall function for the print job.

12. The controller of claim 7, wherein the another print job is a job executed immediately before the print job.

13. The image forming apparatus of claim 7, wherein the memory recall function enables the image forming apparatus to record and save image data for which printing has been completed and to perform printing of this data again by reading the saved image data.

14. A method for controlling printing of an image, the method comprising the steps of:
(a) setting a memory recall function and setting a serial number printing function; and
(b) calculating a starting serial number which is to be given to a first set of prints of a print job in a case where the memory recall function and the serial number printing function are set in step (a).

15. The method of claim 14, wherein, in the step (b), the starting serial number is calculated based on the last serial number given to another print Job previously executed.

16. The method of claim 15, wherein the starting serial number calculated in the step (b) is sequential to the last serial number given to the another print job.

17. The method of claim 14, wherein the memory recall function enables the image forming apparatus to record and save image data for which printing has been completed and to perform printing of this data again by reading the saved image data.

18. In an image forming apparatus which has a memory recall function and a serial number printing function, a controller for the image forming apparatus comprising:
a processor which automatically determines a starting serial number which is to be printed on a first set of prints of a second print job in a case where a memory recall function and a serial number printing function are set, the starting serial number being sequential to the last serial number given to a first print job previously executed.

19. The controller of claim 18, further comprising:
an operation panel from which an operator is capable of setting the memory recall function and the serial number printing function.

20. The controller of claim 18, wherein the first print job is a job executed immediately before the second print job.

21. The controller of claim 18, wherein the memory recall function enables the image forming apparatus to record and save image data for which printing has been completed and to perform printing of this data again by reading the saved image data.

22. A method for controlling printing of an image, the method comprising the steps of:
(a) setting a memory recall function and setting a serial number printing function; and
(b) calculating a starting serial number which is to be printed on a first set of prints of a print job in a case where the memory recall function and the serial number printing function are set in step (a).

23. The method of claim 22, wherein, in the step (b), the starting serial number is calculated based on the last serial number given to another print job previously executed.

24. The method of claim 23, wherein the starting serial number calculated in the step (b) is sequential to the last serial number given to another print job.

25. The method of claim 22, wherein the memory recall function enables the image forming apparatus to record and save image data for which printing has been completed and to perform printing of this data again by reading the saved image data.

26. An image forming method comprising:
storing image data of a print job in a memory;
printing one or more sets of prints using the image data stored in the memory in a first print job;
printing a serial number on each of the sets of prints of the first print job, wherein the serial number on each of the sets of prints is increased sequentially,
printing one or more sets of prints using the image data stored in the memory in a second print job; and
printing a next serial number on a first set of the sets of prints in the second print job, the next serial number being sequential to the serial number of a last set of the first print job.

27. An image forming apparatus comprising:
a scanner for reading image data of documents;
a first memory for storing the image data;
a printer for forming images using the image data stored in the first memory;
a controller for controlling the printer so as to print a first print job which includes one or more sets of prints using the image data stored in the first memory and a serial number on each of the sets of prints of the first print job, wherein the serial number on each of the sets of prints is increased sequentially;
a second memory for storing data relating to the last serial number which has been printed during the first print job;
wherein the controller also controls the printer so as to print a second print job which includes one or more sets of prints using the image data stored in the first memory and a serial number on each of the sets of prints of the second print job, wherein the serial number on each of the sets of prints is increased sequentially, wherein the first serial number used in the second print job is sequential to the last serial number used in the first print job.

* * * * *